United States Patent
Griffiths et al.

(10) Patent No.: US 8,952,629 B2
(45) Date of Patent: Feb. 10, 2015

(54) SOUND-ACTUATED ILLUMINATION CIRCUIT

(75) Inventors: Bryn Griffiths, Hong Kong (CN); Jon Duncan, Whitton (GB)

(73) Assignee: Benmore Ventures Limited, Tortola (VG)

(*) Notice: Subject to any disclaimer, the term of this patent is extended or adjusted under 35 U.S.C. 154(b) by 90 days.

(21) Appl. No.: 13/514,447

(22) PCT Filed: Dec. 13, 2010

(86) PCT No.: PCT/GB2010/002264
§ 371 (c)(1),
(2), (4) Date: Jul. 3, 2012

(87) PCT Pub. No.: WO2011/070336
PCT Pub. Date: Jun. 16, 2011

(65) Prior Publication Data
US 2012/0262092 A1 Oct. 18, 2012

(30) Foreign Application Priority Data

Dec. 11, 2009 (GB) .................................. 0921747.2
Jun. 3, 2010 (GB) .................................. 1009333.4

(51) Int. Cl.
*H05B 37/02* (2006.01)
*H05B 33/08* (2006.01)

(52) U.S. Cl.
CPC ........ *H05B 37/0236* (2013.01); *H05B 33/0854* (2013.01)

USPC ........................ 315/307; 315/200 A; 315/325

(58) Field of Classification Search
CPC ............... H05B 37/02; H05B 37/0209; H05B 37/0236; H05B 37/029; A63J 17/00
USPC ............. 315/200 A, 201, 307, 308, 312, 324, 315/325, 341; 340/815.11
See application file for complete search history.

(56) References Cited

U.S. PATENT DOCUMENTS

| | | | |
|---|---|---|---|
| 4,346,640 A | 8/1982 | Zeno et al. | |
| 5,023,517 A * | 6/1991 | Husak | 315/200 A |
| 5,365,149 A * | 11/1994 | Blakeslee et al. | 315/200 A |
| 5,501,131 A * | 3/1996 | Hata | 84/464 R |
| 5,994,842 A | 11/1999 | Wong | |
| 6,198,229 B1 * | 3/2001 | McCloud et al. | 315/185 R |
| 2003/0161145 A1 | 8/2003 | Liu et al. | |
| 2005/0174066 A1 | 8/2005 | Yen | |

FOREIGN PATENT DOCUMENTS

CN 2138378 7/1993
DE 41 27 765 A1 2/1993
(Continued)

OTHER PUBLICATIONS

The International Search Report dated Apr. 7, 2011.

*Primary Examiner* — Tung X Le
(74) *Attorney, Agent, or Firm* — Thomas | Horstemeyer LLP

(57) ABSTRACT

A circuit (10), for causing a light source (30) to flash in correspondence to the peak amplitudes of an incoming sound signal, e.g. music (12), comprises an audio transducer (14), a band-pass amplifier (16), a peak detector section (18), and a filter (20) connected to a monostable circuit (24) via a capacitor (22). The light source (30) comprises one or more surface mount LED devices, and can be used to illuminate the contents of a container, e.g. a drinks bottle.

21 Claims, 2 Drawing Sheets

(56) References Cited

FOREIGN PATENT DOCUMENTS

| | | |
|---|---|---|
| DE | 4127765 A1 | 2/1993 |
| EP | 1 841 062 A1 | 10/2007 |
| EP | 1841062 A1 | 10/2007 |
| GB | 2 135 536 A | 8/1984 |
| GB | 2135536 A | 8/1984 |
| GB | 2 250 618 A | 6/1992 |
| GB | 2250618 A | 6/1992 |
| GB | 2 326 542 A | 12/1998 |
| GB | 2326542 A | 12/1998 |
| WO | 2004110892 A1 | 12/2004 |
| WO | 2010055312 A1 | 5/2010 |
| WO | 2011007113 A1 | 1/2011 |
| WO | 2011/070338 A1 | 6/2011 |
| WO | 2011070337 A1 | 6/2011 |

* cited by examiner

SOUND-ACTUATED ILLUMINATION CIRCUIT

CROSS-REFERENCE TO RELATED APPLICATION

This application is a co-pending application which claims priority to PCT Application No. PCT/GB2010/002264, filed Dec. 13, 2010, entitled "Sound-Actuated Illumination Circuit" herein incorporated by reference in its entirety. This application also claims priority to, and the benefit of, Great Britain Patent Application 1009333.4, filed Jun. 3, 2010, and Great Britain Patent Application No. 0921747.2, filing date Dec. 11, 2009, both of which are herein incorporated by reference in their entireties.

Circuits are well known for actuating flashing lights in a night club in time with the music. Such circuits are parts of relatively large pieces of equipment which are stationary. WO 2004/110892 discloses a light source which is attached to a container, such as a drinks bottle, and is arranged to be actuated by sound waves from a loudspeaker in a night club. A specific sound wave, such as the bass output, is arranged to act as a trigger to produce flashing of the light source in time with the music.

A feature of existing circuits is that they are only able to respond over a relatively narrow range of sound levels, typically a 15 dB range. This may not be a problem for stationary devices, but for arrangements for articles which move, existing circuits are unable to readily vary their response when their environment changes from being fairly noisy to relatively quiet and vice versa.

Aspects of the present invention seek to overcome or at least reduce the above problem.

In accordance with a first aspect of the present invention, there is provided a circuit for causing a light source to flash in correspondence with the peak amplitudes of a received sound signal, wherein the circuit comprises an audio transducer for receiving the sound signal, a peak detector section which is connected to the output of the audio transducer, and a monostable circuit which is AC coupled to the output of the peak detector section, the output of the monostable circuit being arranged to actuate the light source.

An advantage of this circuit is that it responds to relative changes in the amplitude of received sound signals rather than depending upon the absolute values of such signals.

The connection of the audio transducer to the peak detector section is preferably by way of a DC coupling. This prevents limitations on the low frequency response by eliminating otherwise necessary series capacitors and reduces component count.

A band-pass amplifier is preferably connected between the audio transducer and the peak detector section. With a preferred pass band range of frequencies of 50 kHz to 160 kHz, this excludes extraneous noise, such as traffic and aircraft noise, but still includes useful information, e.g. most of the beat information in a received musical signal.

In preferred embodiments, the peak detector has a fast response time and a relatively slow decay time. The peak detector preferably responds to the rising edge of a received signal. These features ensure that the flashing light provides a pleasing yet faithful response to the music, or of the received sound.

The light source preferably comprises one or more surface mount LED devices, which permits a high packing density and a bright light display.

The circuit may further comprise a control arrangement for controlling the audio transducer output level in response to the output of the monostable circuit. The control arrangement may include a programmed microcontroller which is configured to count the number of beats received from an incoming musical signal. Such a circuit arrangement provides a self-adjusting feature, whereby correct triggering of the monostable circuit and thus the light source is maintained even when the incoming amplitude levels vary substantially.

The control arrangement may conveniently apply a pulse-width modulation technique to the voltage and current feed to the audio transducer.

Embodiments of the present invention relate to a self-contained illumination device for illuminating the contents of beverage bottles and other container types that does not necessitate any modifications to the bottle/container. This provides a powerful new marketing and promotional tool for the beverage industry. They may be triggered on detection of the bass beat in a music track, so that LEDs flash in time to the bass beat, illuminating the contents accordingly so they appear synchronised to the music being played in a venue. Such a device needs to be capable of self-adjusting to different volume levels of music and detecting the bass beat in different styles of music e.g. rock music, dance music, country and western music etc. In different types of venue from a bar playing relatively soft background music, through to very loud night club environments, the device is able to automatically adjust to the different volume levels and music styles accordingly. An additional benefit of having the device self-adjust to different volume levels of music is that when the device is moved from one part of a venue to another (e.g. if it were attached to a 33 cl beer bottle), it would continue to function just as effectively. Throughout the acoustic space in a venue the sound levels can vary significantly. This provides the drinks industry with a cost effective promotional tool allowing a single design of the device to be used on or off premise anywhere that the device is exposed to music.

Another advantage of the device is that the circuit design allows the device to fit into a small space i.e. into the base recess of a 33 cl beer bottle or larger. Hence, as preferred embodiments of the device utilise surface mount components including surface mount LED devices, the component count is preferably be kept to a minimum.

An audio transducer is employed. The resulting signal from the audio transducer may require amplification or attenuation, with or without frequency filtering, to bring the signal level to within the operating area of the remaining circuit. The circuit can, as such, be modified to operate across different spans of audio levels. The circuit herein described can successfully respond to different audio levels spanning a range of at least 36 dB.

When using an electret condenser microphone, an effective approach is to amplify the signal in the range 50 Hz to 160 Hz as most beat information is contained in this audio band. Amplifying frequencies below 50 Hz can result in amplifying traffic rumble, low flying aircraft and other low frequency noises. When the device is set at its most sensitive level, responses to these erroneous signals are not desired.

The output of the band-pass amplifier is connected to the input of a peak detect circuit. The peak detect circuit is arranged to respond to the rising edges of incoming signals.

An advantage of the above circuit is that it provides an output representing the received sound signal for widely-varying levels of sound.

The circuit can be preset to start to respond at a selected sound level, below which it will not respond as the incoming sounds are too quiet. Above that level the circuit responds as the level increases until the maximum rail voltage is reached and the signal level around that point is saturated with little or no discernible changes occurring.

A band-pass amplifier is preferably provided between the microphone and the peak detector. The band-pass amplifier preferably passes signals in the range from substantially 50 Hz to substantially 160 Hz.

A filter is preferably provided between the peak detector and the monostable circuit. The combination of the peak detector and the filter has a fast response but a slow decay. The decay may be up to substantially five seconds.

In accordance with a second aspect of the present invention, there is provided a method of causing a light source to flash in accordance with the peak amplitude of a received sound signal employing a circuit in accordance with the first aspect. The sound signal may be a music and/or vocal signal.

In a preferred method, the output of the audio transducer is used in a feedback loop to control the voltage and current feed to the audio transducer.

It would be desirable to provide a light-emitting device which shone more brightly. For bonded LEDs, this can be done by passing more current through them, but they may degrade rapidly with high levels of current, especially if they are used in a flashing display.

Another desirable feature would be to have a light-emitting device which could emit lights in a multiplicity of different colours, so as to provide an interesting display.

However, in devices for illuminating containers, space is usually at a premium. In bottles, for example, it is often required to squeeze an illuminating device and its associated circuitry into a relatively small bottom recess.

Bonding LEDs is a partially manual process. A machine is used, which has coordinates programmed into it, in order to add bonding wires. This machine is under manual control for the decision to bond each point. Resin is then applied manually to cover the mounted LED, typically in a dome shape. A problem with this application of resin is that it can spread over a relatively large surrounding area, and thus may encroach into spaces provided for other components or onto pad areas which are later required for the hand soldering of other components. This may impose design constraints so that one is prevented from using the best components for a specific design, because the components cannot fit into the available space. Lack of space also means that compromises in the positioning of the LEDs may have to be made, even at the design stage.

Spreading of the resin may also overlap the area for cell insertion, so that a cell may be undesirably lifted away from an underlying printed circuit board by even small amounts of hardened resin. This can produce malfunctioning of the device due to intermittent battery connections. Sometimes the resin encroachment into the battery areas means one cannot push the battery under the battery clip.

When a bonded LED and its resin are placed very close to a pad which requires hand soldering, it becomes possible for a worker to accidentally burn the resin, altering its light dispersion and light output and sometimes the colour of light becomes tinted by discoloured resin.

To overcome or reduce one or more of the above problems, preferred embodiments comprise a plurality of surface-mount LEDs.

Since SMD (Surface Mount Devices) LEDs are relatively small compared to the area used for bonded LEDs and other light-emitting components, they enable the light-emitting device to be particularly compact, or they allow more LEDs to be provided in the same space.

Although SMD LEDs can be applied by hand, it is expedient if they are applied solely by machine, so that the process can be automated. When applied by machine, the solder used is minimised and neat and contained within a well defined area. This enables the process to be quick and to be cost effective for high volume production.

SMD LEDs can also be placed very close to the battery entry point because there is no resin required that can cause problems with battery insertion or resin creep into the battery location area.

SMD LEDs also give the workers soldering the battery clips less of a problem because they are small and easier to avoid.

SMD LEDs also provide greater consistency from one LED to the next in terms of colour and light output. For example bonded white LEDs are produced by hand-doping blue LEDs with a phosphor. Doping by hand is subject to wide tolerances and often leads to inconsistencies in colour and light output.

A further advantage of using SMD LEDs is that the angle of light dispersion can be carefully controlled to maximise the contents illumination opportunities. Thus they provide improved options for consistency and range of choice.

A preferred embodiment of the present invention will now be described, by way of example only, with reference to the accompanying drawings of which:

Figure 1:
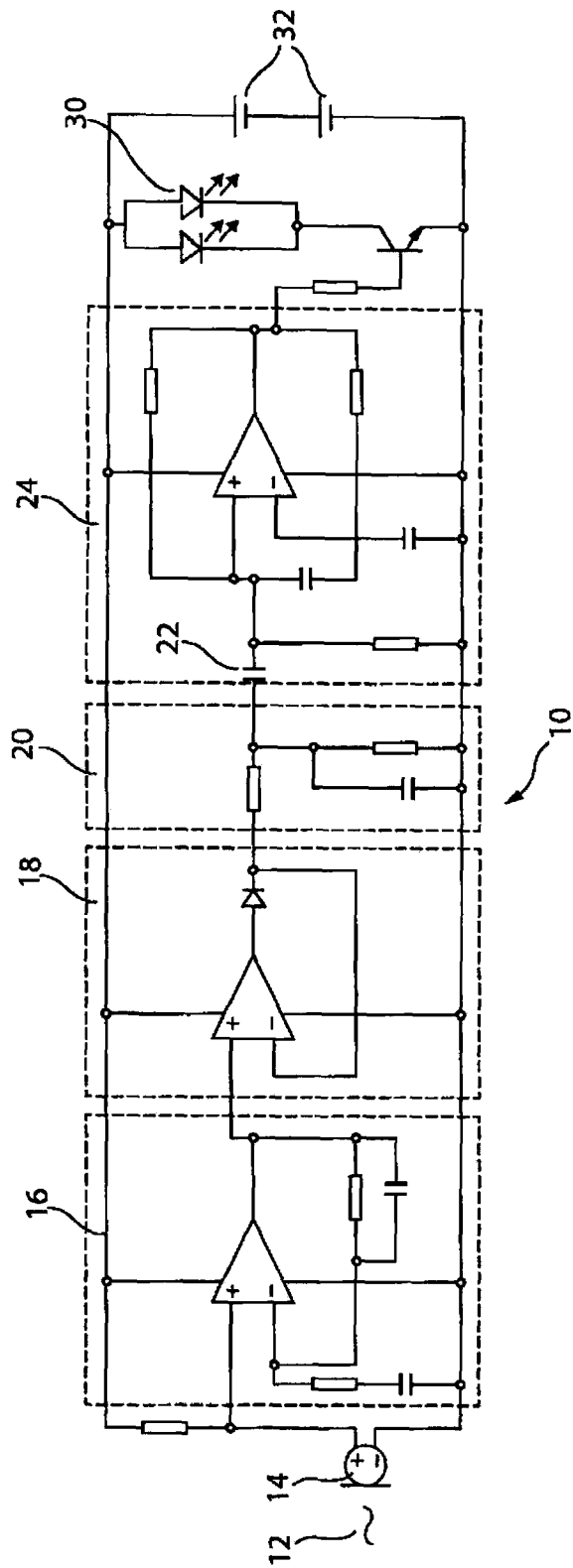
FIG. 1 shows a circuit for causing a light source to flash in time with an incoming sound signal.

Referring to the drawings, FIG. 1 shows a circuit 10 for causing a light source in the form of LEDs 30 to flash in time with an incoming sound signal 12. The incoming sound signal 12, especially music, is detected by an electret condenser microphone 14. This is supplied to a band-pass amplifier 16 which amplifies signals in the range 50 Hz to 160 Hz.

The output of the band-pass amplifier is connected to the input of a peak detector circuit 18, which is configured to respond to the rising edges of incoming signals. The output peaks of the peak detector are proportional to the peak level of the loudest audio sound within the specified audio band.

Figure 2:
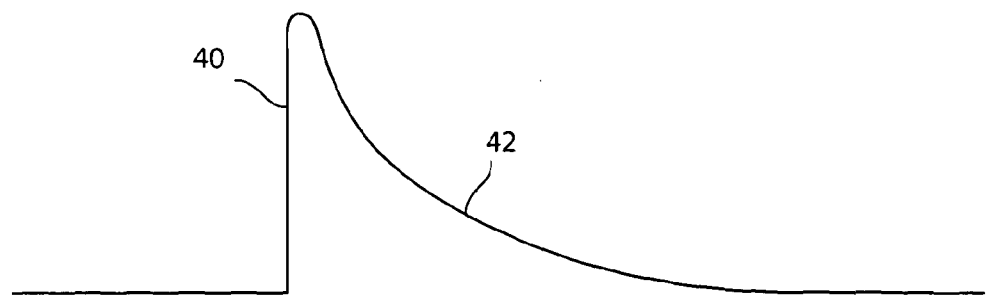
FIG. 2 shows a signal in a DC path within the circuit of FIG. 1.

The output of the peak detector circuit 18 is connected to a filter circuit 20. This serves to remove noise perturbations and other low and high frequency unwanted signals, leaving the peaks as clean as possible. Music beats which are clearly distinctive and separate from other sounds in the same frequency band cause a fast leading-edge rise in the output signal. When the incoming signal amplitude is low, because the audio level is low, the output of the peak detector circuit 18 is also low. The circuits 18 and 20 together have a fast response 40 but slow decay 42, see FIG. 2. The decay is set to approximately 5 seconds. This has the advantage of considerably reducing the impact of shifting voltage rails on the required trigger signal.

Figure 3:
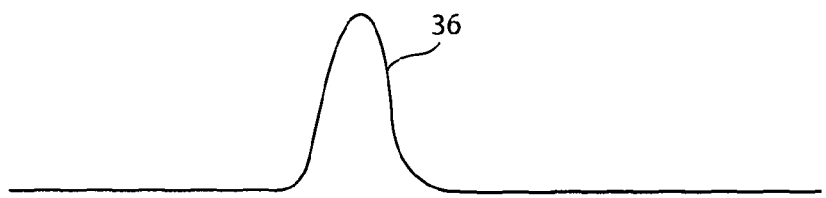
FIG. 3 shows a signal in a subsequent AC path within the circuit of FIG. 1.

The output of filter circuit 20 is connected via a capacitor 22 to the input of a monostable circuit 24. If, during the long delay (or long decay) period 42 shown in FIG. 2 another peak occurs, then the amplitude of that peak will be in proportion to the corresponding audio level. The long decay, being a very slow drop in voltage, is similar to DC, so the use of capacitor 22 at this point produces a waveform 36 as shown in FIG. 3. It will be noted that the DC-like part of FIG. 2 has been removed. The remaining signal 36 forms a trigger pulse for the monostable circuit 24. For each subsequent incoming peak, the trigger pulse 36 starts from at or near zero, rises quickly up to the peak level and is reset very soon after. The decay 42 continues and even as the LED's 30 go on (because of the trigger) and influence the voltage rail, the output from the filter after the peak is left reasonably undisturbed. The long decay 42 buffers the circuit sections from each other and reduces the effect of the operation of monostable 24 on its own trigger source.

Thus it will be seen that the trigger signal is AC coupled into the monostable circuit. The AC coupling ensures that the voltage offset is ignored, but allows the fast rising-edge of the trigger to pass. With varying audio and peak levels, the trigger arriving at the monostable is still a fast rising-edge trigger with respect to circuit ground, only with varying amplitude. However, the monostable is immune to variations in input amplitude as it responds to the first lowest-level part of the rising-edge trigger signal. Shortly after the monostable is triggered; the charge placed on the input capacitor 22 by the trigger signal 36 is removed, thus allowing a re-trigger to occur as soon as the monostable has returned to its stable state.

The monostable 24 is connected to the LED's 30 and is used so that the on-time of the LEDs is controlled and not dependent on music type or level, and this also ensures that the LEDs are clearly visible and respond in real time to the audio peaks. When the circuit 10 is placed in an environment where music is the prevalent and primary audio source, the device responds to the music beats.

The circuit 10 reduces component count by using the voltage generated across the electret microphone 14 as the bias voltage for the first two stages 16, 18. Hence the first two stages are DC coupled. This also prevents limitations on the low frequency response by not requiring series capacitors. The monostable section 24 is built around a known 358-type operational amplifier. However, the second op-amp in the 358 package is not used for the peak detect or amplifier stages as its common bias circuitry upsets the operation of these stages when the monostable is triggered. Other monostable configurations have not been found to have as good trigger sensitivity. It is desirable to have the LEDs flashing at the greatest brightness possible. When the circuit is powered by small coin type cells, which have a limited output current, it is not always desirable to have further current limiting on the LEDs. Without current limiting, each time the LEDs are turned on, the supply voltage will be pulled down to the forward voltage drop of the LEDs. For most circuit arrangements, this can irrevocably upset the operation of these parts of the circuit. However, the above-described circuit is substantially immune to this effect.

Other light sources may be used instead of LEDs. Other operational amplifiers may be used which do not require an external transistor to drive the LEDs.

It would be possible to employ a circuit which provided an output in response to the falling part of an input signal, but this is not so advantageous because there is a perceptible delay in the response of the circuit since the falling part of the wave occurs after the relevant stimulating event. An alternative approach to the circuit of FIG. 1 is to use a microphone to pick up the sound and to feed this signal, with some filtering out of high frequencies, directly into a monostable circuit or a comparator. Where the music has a distinct bass beat, which is common to most popular music, the beat often has the highest energy content and consequently has the greatest amplitude part of the waveform. This can be used to directly trigger a monostable or comparator. The resulting change in output, at the correct threshold level, will correspond to the bass beat of the music. The output pulse from the monostable or comparator can be set to have sufficient width such that the primary rising slope of the incoming audio signal above a pre-determined threshold creates the output pulse, but remaining parts of the wave below this threshold are ignored. Where the sound level is too great, then other parts of the same waveform can have sufficient amplitude to cause the same triggering. Therefore, for practicality, it is necessary to introduce a system to control the incoming voltage level from the microphone.

One method of controlling the microphone output level is by means of pulse width modulation to change the voltage and current feed to the microphone. The low-pass filtering already in place for the audio can also remove the high frequency parts of the pulse width modulation which would otherwise appear superimposed on the audio signal. An alternative method is to use a series or parallel connected n-channel mosfet or other transistor which is set to either increase the source resistance or clamp the signal. Such a transistor can also be pulse width modulation controlled where the PWM is smoothed out into a control voltage. The pulse width modulation can be generated from a programmed microcontroller which is programmed to count the number of incoming bass beat pulses and to respond accordingly to too many pulses or too few. Thus, as the level of incoming audio changes, the circuit can respond and adjust to the new level. The output from the monostable or comparator may then be used to drive LEDs which will then be flashing in time with the bass-beat.

The microcontroller can be used to directly drive the LEDs. It is also possible to create, by analogue means, a control voltage which is used to set the operation of the transistor for level control. In addition, it is possible to process the signal directly from a microphone with a microcontroller. However, for practical purposes it would be preferred that the signal is processed by analogue means before it reaches the microcontroller. Comparing this approach to the above-described circuit 10, it can be seen that the microcontroller would effectively become a replacement for the monostable section.

Any of the above approaches may be integrated into a single chip.

Figure 4:
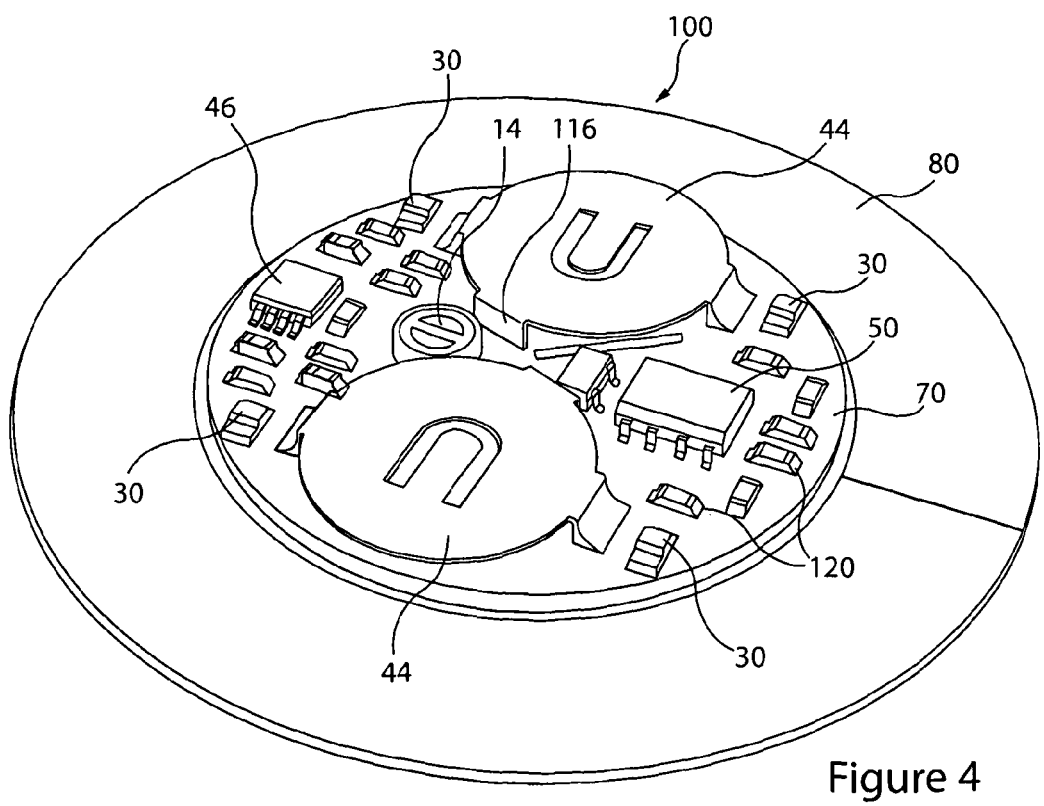
FIG. 4 shows the lay-out of components on a printed circuit board incorporating the circuit of FIG. 1.

FIG. 4 shows light emitting device 100 with a printed circuit board 70 arranged to incorporate the circuit of FIG. 1. The board 70 is attached to an adhesive label 80 as disclosed in co-pending application PCT/GB2009/002097.

Referring to FIG. 4, a light-emitting device 100 comprises a printed circuit board (PCB) 70, upon which are mounted battery cell clips 44, a first integrated circuit 46, corresponding generally to circuit sections 16 and 18, a second integrated circuit 50, corresponding generally to circuit sections 20 and 24, one or more resistors 120 and four LEDs 30. The LEDs are rectangular surface mount LEDs (SMD LEDs) and are arranged adjacent to the periphery of board 12 on opposite sides of the cell clips 44.

The device is manufactured by applying all the SMD components, viz the four LEDs 22 and resistors 120 at the same time using a machine.

The accuracy of placement position, and the quality of soldering for all the surface mount devices are better when all done by machine.

Before use, battery cells are installed within clips 44 by being pushed against stop members 116.

The above-described device has various advantages. The SMD LEDs 30 are compact and, being rectangular, pack well among other surface components. The above-mentioned disadvantages of the subsequent covering with resin are also avoided.

Any desired number and pattern of SMD LEDs may be provided.

In addition to the bottles etc disclosed in WO 2004/110892 and PCT/GB2009/002097, the device may be attached to a wide range of articles such as cigarette packets etc as disclosed in co-pending application PCT/GB2009/002676, ash trays, cornflake packets, and containers for toothpaste, cosmetics, foodstuffs etc. The device can be attached to the wall of a room, e.g. inside a night club. It can also be incorporated inside the housing of a disco light; this provides a compact and automatically-adjusting unit.

The features of the present disclosure may be substituted for or combined with, as appropriate, the features of co-pending international patent applications entitled "Switch-Actuated Arrangements" and entitled "Switch Actuated Circuits", both filed on even date.

The invention claimed is:

1. A circuit (10) for causing a light source (30) to flash in correspondence with the peak amplitudes of a received sound signal (12), wherein the circuit comprises an audio transducer (14) for receiving the sound signal, a peak detector section (18) which is connected to the output of the audio transducer, and a monostable circuit (24) which is AC coupled to the output of the peak detector section, the output of the monostable circuit being arranged to actuate the light source, and wherein the monostable circuit (24) comprises an amplifier having first and second inputs and an output connected to the output of the monostable circuit, said first input being directly connected to the AC input of the monostable circuit, and said second input being connected to a circuit node, said node being situated between first and second capacitors, said capacitors being connected in series across the AC input of the monostable circuit.

2. A circuit according to claim 1, wherein the connection from the audio transducer (14) is DC coupled to the peak detector section (18).

3. A circuit according to claim 1, wherein the output of the audio transducer (14) is connected to a band-pass amplifier (16), the output of which is connected to the peak detector section (18).

4. A circuit according to claim 3 wherein the pass band of the amplifier (16) is substantially 50 Hz to 160 Hz.

5. A circuit according to claim 1, wherein the output of the peak detector section (18) is connected to a filter circuit (20), the output of which is connected to the monostable circuit (24).

6. A circuit according to claim 1, wherein the audio transducer (14) is an electret condenser microphone.

7. A circuit according to claim 1, wherein the peak detector section (18) has a fast response time and a relatively slow decay time.

8. A circuit according to claim 1, wherein the peak detector section (18) responds to the rising edge of a received signal.

9. A circuit according to claim 1, and further comprising a control arrangement for controlling the audio transducer output level in response to the output of the monostable circuit (24).

10. A circuit according to claim 9, wherein the control arrangement includes a programmed microcontroller which is configured to count the number of beats received from an incoming musical signal.

11. A circuit according to claim 9, wherein the control arrangement is arranged to apply pulse width modulation to the voltage and current feed to the audio transducer (14).

12. A circuit according to claim 9, wherein the light source comprises one or more surface mount LED devices.

13. A device for illuminating the contents of a bottle comprising a circuit according to claim 9.

14. A method of causing a light source to flash in accordance with the peak amplitude of a received sound signal employing a circuit according to claim 1.

15. A method according to claim 14, wherein the output of the audio transducer (14) is used to control the voltage and current feed to the audio transducer.

16. A circuit according to claim 1, wherein the monostable circuit further comprises a first resistor connected across the AC input of the monostable circuit, a second resistor connected between the AC input and the output of the monostable circuit, and a third resistor connected between said circuit mode and the output of the monostable circuit.

17. A circuit (10) for causing a light source (30) to flash in correspondence with the peak amplitudes of a received sound signal (12), wherein the circuit comprises an audio transducer (14) for receiving the sound signal, a peak detector section (18) which is connected to the output of the audio transducer, a monostable circuit (24) which is AC coupled to the output of the peak detector section, the output of the monostable circuit being arranged to actuate the light source, and a control arrangement for controlling the audio transducer output level in response to the output of the monostable circuit (24).

18. A circuit according to claim 17, wherein the control arrangement includes a programmed microcontroller which is configured to count the number of beats received from an incoming musical signal.

19. A circuit according to claim 17, wherein the control arrangement is arranged to apply pulse width modulation to the voltage and current feed to the audio transducer (14).

20. A circuit according to claim 17, wherein the light source comprises one or more surface mount LED devices.

21. A device for illuminating the contents of a bottle comprising a circuit according to claim 17.

* * * * *